United States Patent
Weisberger

(10) Patent No.: US 8,453,258 B2
(45) Date of Patent: May 28, 2013

(54) PROTECTING AN ELECTRONIC DOCUMENT BY EMBEDDING AN EXECUTABLE SCRIPT

(75) Inventor: Andrea M. Weisberger, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 288 days.

(21) Appl. No.: 12/882,536

(22) Filed: Sep. 15, 2010

(65) Prior Publication Data
US 2012/0066773 A1 Mar. 15, 2012

(51) Int. Cl.
*H04L 9/14* (2006.01)
*G06F 21/10* (2006.01)

(52) U.S. Cl.
CPC ........ *G06F 21/10* (2013.01); *G06F 2221/2129* (2013.01)
USPC ...................... 726/29; 726/30; 726/9; 726/20

(58) Field of Classification Search
USPC .......................................................... 726/20
See application file for complete search history.

(56) References Cited

U.S. PATENT DOCUMENTS

| | | | | |
|---|---|---|---|---|
| 6,161,145 A | * | 12/2000 | Bainbridge et al. | 709/246 |
| 6,332,193 B1 | * | 12/2001 | Glass et al. | 713/170 |
| 6,343,361 B1 | * | 1/2002 | Nendell et al. | 713/171 |
| 6,397,261 B1 | * | 5/2002 | Eldridge et al. | 713/171 |
| 6,601,102 B2 | | 7/2003 | Eldridge et al. | |
| 6,745,327 B1 | | 6/2004 | Messing | |
| 7,111,324 B2 | * | 9/2006 | Elteto et al. | 726/9 |
| 7,206,936 B2 | * | 4/2007 | Aull et al. | 713/173 |
| 7,269,844 B2 | * | 9/2007 | Elteto et al. | 726/2 |
| 7,334,254 B1 | * | 2/2008 | Boydstun et al. | 726/2 |
| 2001/0034718 A1 | * | 10/2001 | Shaked et al. | 705/64 |
| 2001/0037451 A1 | * | 11/2001 | Bhagavatula et al. | 713/155 |
| 2002/0056043 A1 | * | 5/2002 | Glass | 713/179 |
| 2002/0163653 A1 | * | 11/2002 | Struble et al. | 358/1.2 |
| 2003/0046536 A1 | * | 3/2003 | Bruekers et al. | 713/158 |
| 2003/0196087 A1 | * | 10/2003 | Stringer et al. | 713/171 |

(Continued)

FOREIGN PATENT DOCUMENTS

| | | | |
|---|---|---|---|
| EP | 1710725 A2 | * | 10/2006 |
| EP | 1788746 A2 | * | 5/2007 |
| JP | 2000134250 A | | 5/2000 |

OTHER PUBLICATIONS

Adrian Nelson. PDF Document Encryption and Password Protection. 2008. Available online: http://web.archive.org/web/20081119075126/http://www.utilitywarrior.com/PDF-Document-Encryption-And-Password-Protection.htm.*

(Continued)

*Primary Examiner* — Joshua Joo
*Assistant Examiner* — Benjamin A Jenkins
(74) *Attorney, Agent, or Firm* — Michael A. Springs; Moore & Van Allen PLLC; Esther F. Queen

(57) ABSTRACT

Embodiments of the present invention relate to methods and apparatuses for safeguarding information by, for example, controlling access to electronic files. Some embodiments of the present invention provide a method that includes embedding a script in an electronic file, where the script comprises commands that when operated on by a processor allow a recipient device to access the electronic file if either a token associated with the recipient device is detected or the recipient device is determined to be an authorized device.

27 Claims, 8 Drawing Sheets

U.S. PATENT DOCUMENTS

| | | | |
|---|---|---|---|
| 2004/0073672 A1* | 4/2004 | Fascenda | 709/225 |
| 2005/0091544 A1* | 4/2005 | Lambert | 713/202 |
| 2006/0047954 A1* | 3/2006 | Sachdeva et al. | 713/165 |
| 2006/0272031 A1* | 11/2006 | Ache et al. | 726/28 |
| 2007/0040021 A1* | 2/2007 | Nakayma | 235/380 |
| 2007/0100768 A1* | 5/2007 | Boccon-Gibod et al. | 705/59 |
| 2007/0143831 A1* | 6/2007 | Pearson et al. | 726/5 |
| 2007/0288393 A1 | 12/2007 | Boyer et al. | |
| 2008/0015986 A1* | 1/2008 | Wright | 705/44 |
| 2008/0313707 A1* | 12/2008 | Jain et al. | 726/2 |
| 2009/0083843 A1* | 3/2009 | Wilkinson et al. | 726/9 |
| 2009/0132813 A1* | 5/2009 | Schibuk | 713/158 |
| 2009/0171982 A1* | 7/2009 | Hagan et al. | 707/10 |
| 2010/0083360 A1* | 4/2010 | Zhang et al. | 726/7 |

OTHER PUBLICATIONS

"Customer Care Center—Online User Manual, Live Support" published by CoolPDF, Inc. 2006. Available online: http://web.archive.org/web/20061108141750/http://www.pdf2exe.com/manual.html.*

* cited by examiner

PROTECTING AN ELECTRONIC DOCUMENT BY EMBEDDING AN EXECUTABLE SCRIPT

FIELD

In general terms, embodiments of the present invention relate to methods, apparatuses, and computer program products for safeguarding information by, for example, controlling access to electronic files.

BACKGROUND

Information contained in an electronic file is often difficult to control once that electronic file has been sent to a recipient because the recipient can usually view, manipulate, copy, and/or proliferate the information contained in the electronic file at will. Conventional attempts that use, for example, passwords to control and/or restrict the use of electronic files have proven inadequate. Thus, there is a need to provide methods and apparatuses for safeguarding information that overcomes the problems of the prior art.

SUMMARY OF SELECTED EMBODIMENTS OF THE PRESENT INVENTION

In general terms, embodiments of the present invention relate to methods and apparatuses for sending and controlling access to electronic files. For example, some embodiments of the present invention are configured to embed a script in an electronic file, where the script is configured to provide a recipient device with access to the electronic file based at least partially on the script detecting a token associated with the recipient device. In some embodiments, the script is configured to detect the token without communicating with a user of the recipient device. Additionally or alternatively, some embodiments of the present invention are configured to embed the script upon creation of the electronic file. In some embodiments, the electronic file includes confidential information. Accordingly, it will be understood that the implementation of one or more of the embodiments of the present invention can significantly improve control over information.

More specifically, in some embodiments of the present invention, an apparatus is provided that includes a processor configured to embed a script into an electronic file, where the script comprises commands that when operated on by the processor allow the recipient device to access to the electronic file if either a token associated with the recipient device is detected or the recipient device is determined to be an authorized device.

In some embodiments of the apparatus, the electronic file includes confidential information. Additionally or alternatively, in some embodiments, the processor is configured to embed the script upon creation of the electronic file. In some embodiments, the script is configured to detect the token without the script communicating with a user of the recipient device.

In some embodiments of the apparatus, the script includes a target identifier and is configured to provide the recipient device with access to the electronic file based at least partially on the script determining that an identifier associated with the recipient device matches the target identifier. Further, in some embodiments, the script is configured to block access to the electronic file upon the script determining that the identifier associated with the recipient device does not match the target identifier. In some embodiments, the processor is configured to send the electronic file comprising the script to the recipient device. Additionally or alternatively, the processor is further configured to embed the token into the electronic file prior to the process sending the electronic file comprising the script to the recipient device.

In some embodiments, the token is stored at a specific location in the recipient device. Also, in some embodiments, the token comprises hardware. Additionally or alternatively, in some embodiments, the token comprises software. In some embodiments, the token is configured to be valid for a limited period of time. Additionally or alternatively, in some embodiments, the processor is further configured to issue a revocation token to the recipient device, wherein the revocation token is configured to disable the token associated with the recipient device. In some embodiments, the processor is further configured to issue the token to the recipient device. In some embodiments, the processor is further configured to issue the token to the recipient device prior to the processor sending the electronic file comprising the script to the recipient device.

As another example, in some embodiments of the present invention, a method is provided that includes embedding, using a processor, a script in an electronic file, where the script comprises commands that when operated on by the processor allow a recipient device to access to the electronic file if either a token associated with the recipient device is detected or the recipient device is determined to be an authorized device.

The method further includes, in some embodiments, embedding the script upon creation of the electronic file. In some embodiments, the script is configured to detect the token without the script communicating with a user of the recipient device.

In some embodiments of the method, the script includes a target identifier and is configured to provide the recipient device with access to the electronic file based at least partially on the script determining that an identifier associated with the recipient device matches the target identifier. Further, in some embodiments, the script is configured to block access to the electronic file upon the script determining that the identifier associated with the recipient device does not match the target identifier. In some embodiment, the method further comprises sending the electronic file comprising the script to the recipient device.

Additionally or alternatively, the method includes embedding the token into the electronic file prior to sending the electronic file comprising the script to the recipient device. In some embodiments, the token is configured to be valid for a limited period of time. Additionally or alternatively, in some embodiments, the method further includes issuing a revocation token to the recipient device to disables to the token associated with the recipient device. Also, in some embodiments, the method further includes issuing the token to the recipient device. And in some embodiments, the method further includes issuing the token to the recipient device prior to sending the electronic file comprising the script to the recipient device.

As still another example, in some embodiments of the present invention, a computer program product is provided that includes a non-transitory computer-readable medium where the computer readable medium includes computer-executable program code portions stored therein, and where the program code portions include a first program code portion configured to embed a script in an electronic file, where the script comprises commands that when operated on by a processor allow the recipient device to access to the electronic file if either a token associated with the recipient device is detected or the recipient device is determined to be an authorized device.

In some embodiments of the computer program product, the first program code portion is configured to embed the script upon creation of the electronic file. In some embodiments, the script is configured to detect the token without receiving input from a user of the recipient device.

In some embodiments of the computer program product, the script includes a target identifier and is configured to provide the recipient device with access to the electronic file based at least partially on the script determining that an identifier associated with the recipient device matches the target identifier. Further, the computer program product further includes a second program code portion configured to embed the token into the electronic file prior to the second program code portion sending the electronic file comprising the script to the recipient device. In some embodiments, the computer program product further includes a second program code portion configured to send the electronic file comprising the script to the recipient device. Additionally or alternatively, in some embodiments, the computer program product further includes a second program code portion configured to issue the token to the recipient device.

BRIEF DESCRIPTION OF THE DRAWINGS

Figure 1:
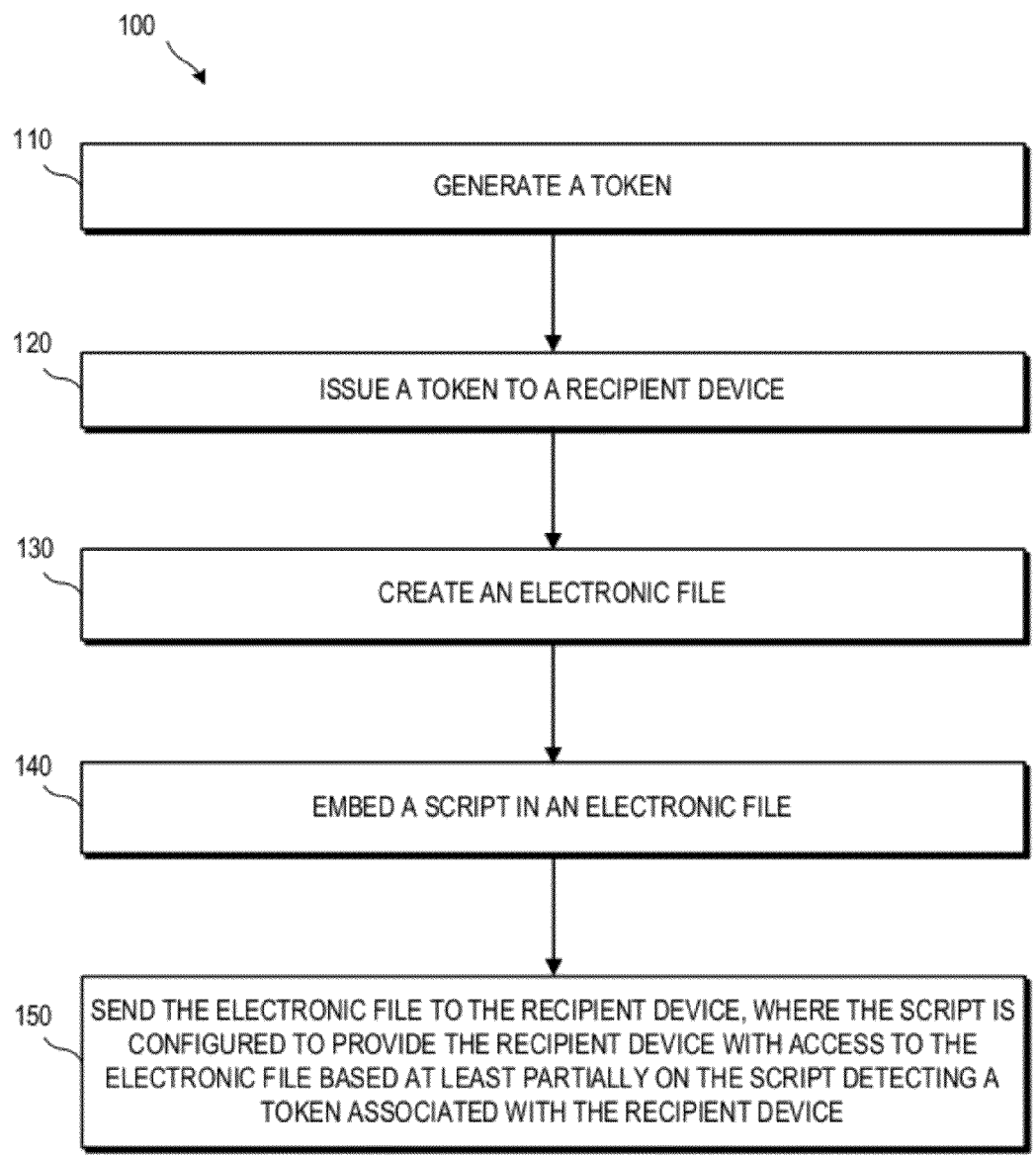
Figure 2A:
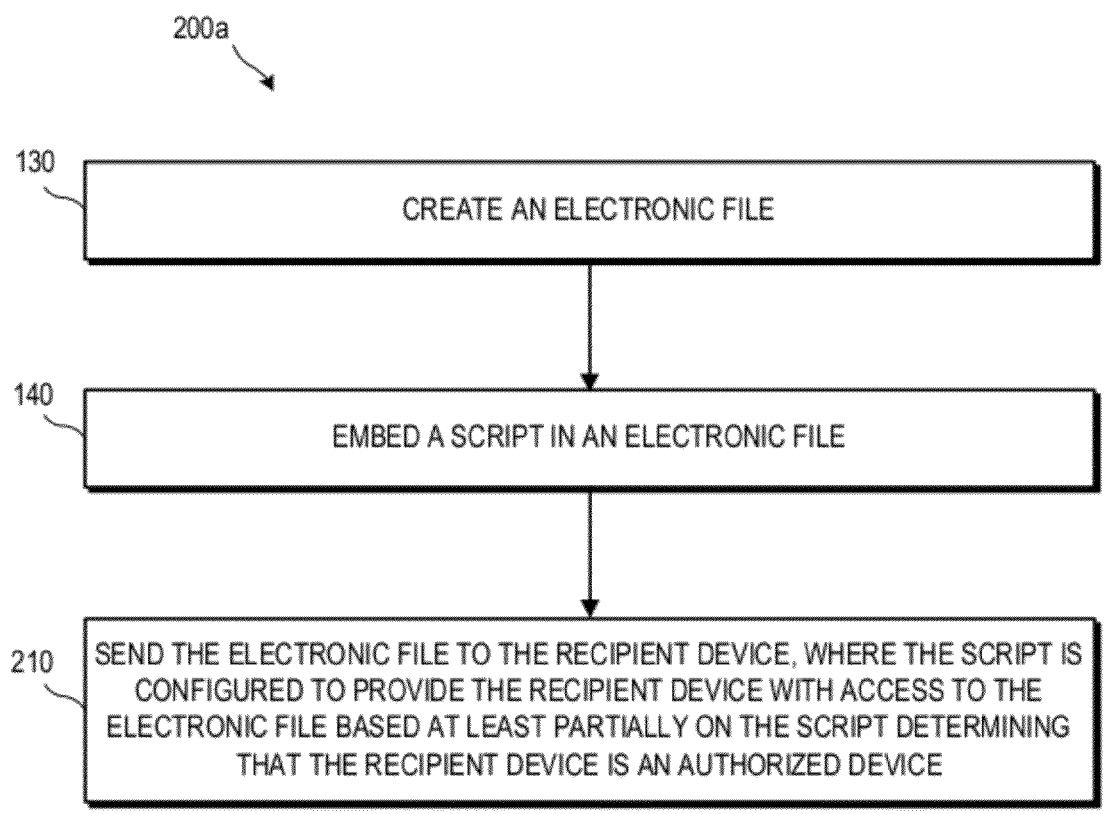
Figure 2B:
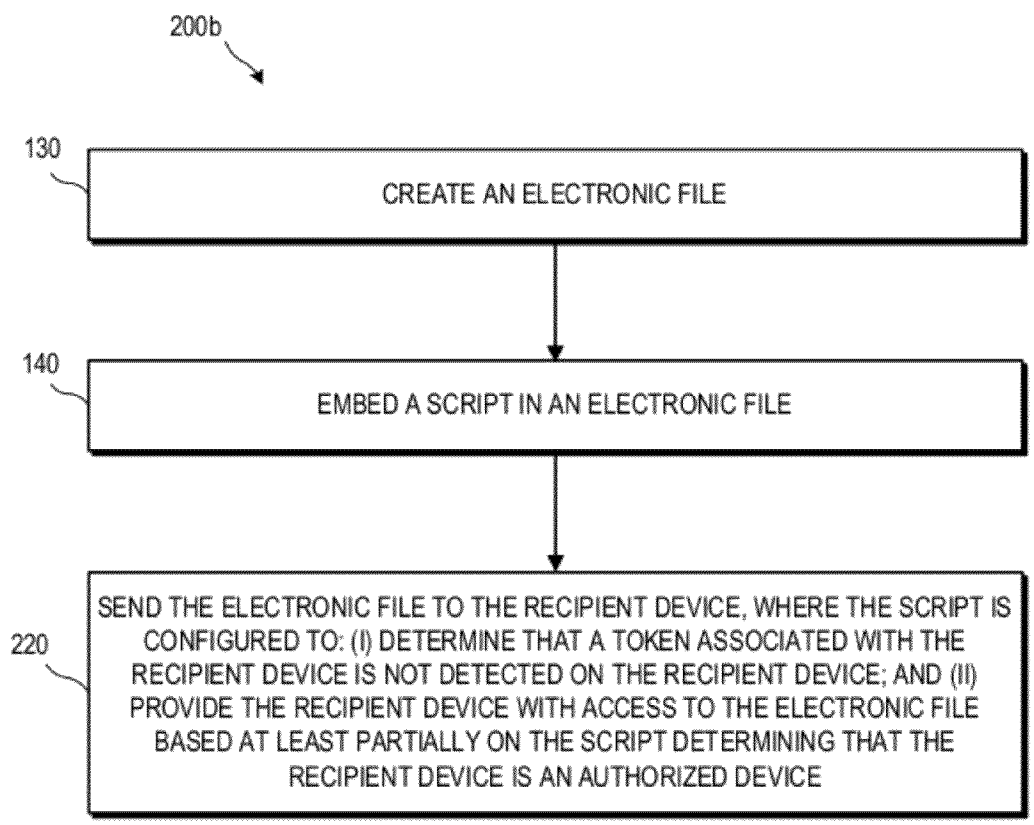
Figure 3:
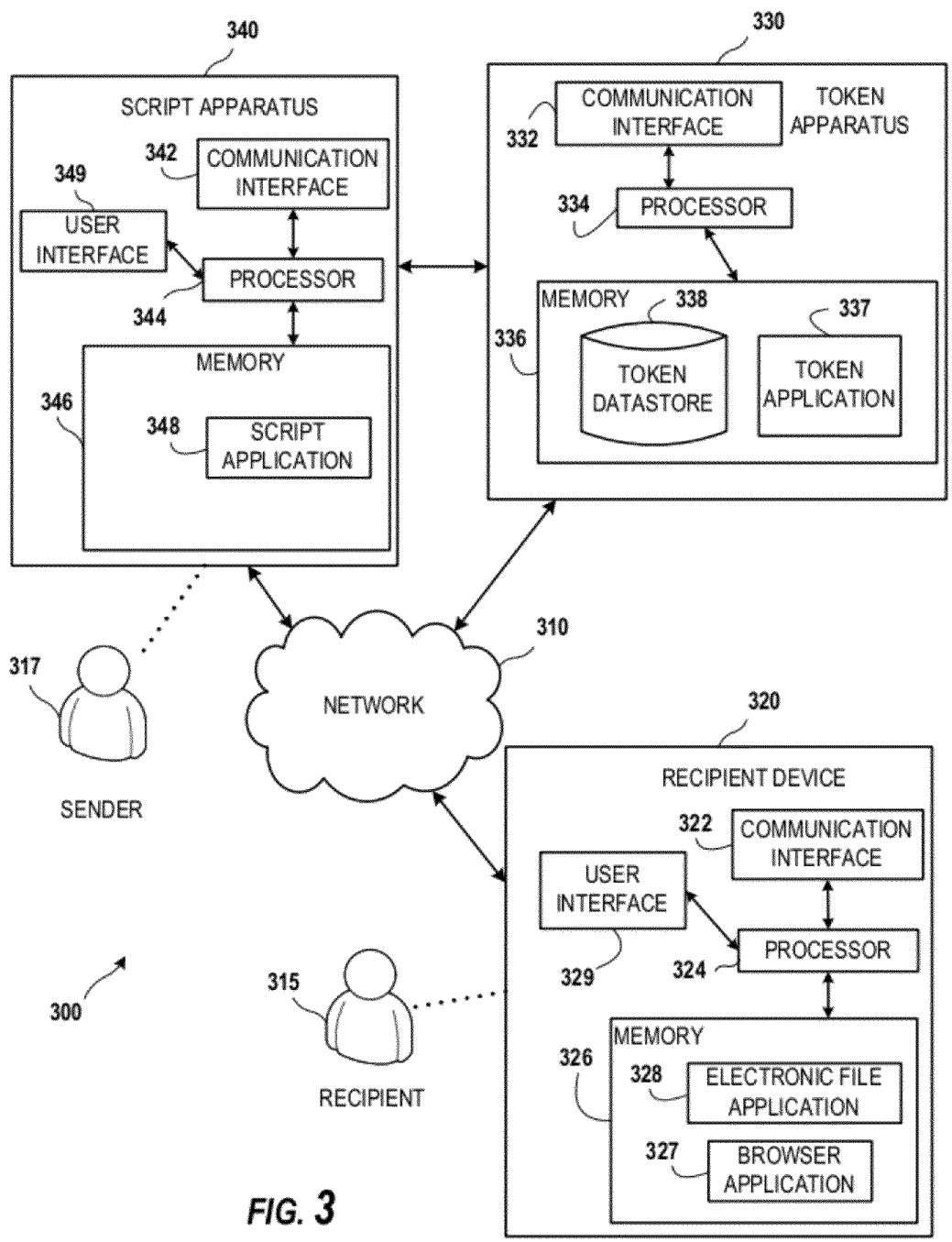
Figure 4:
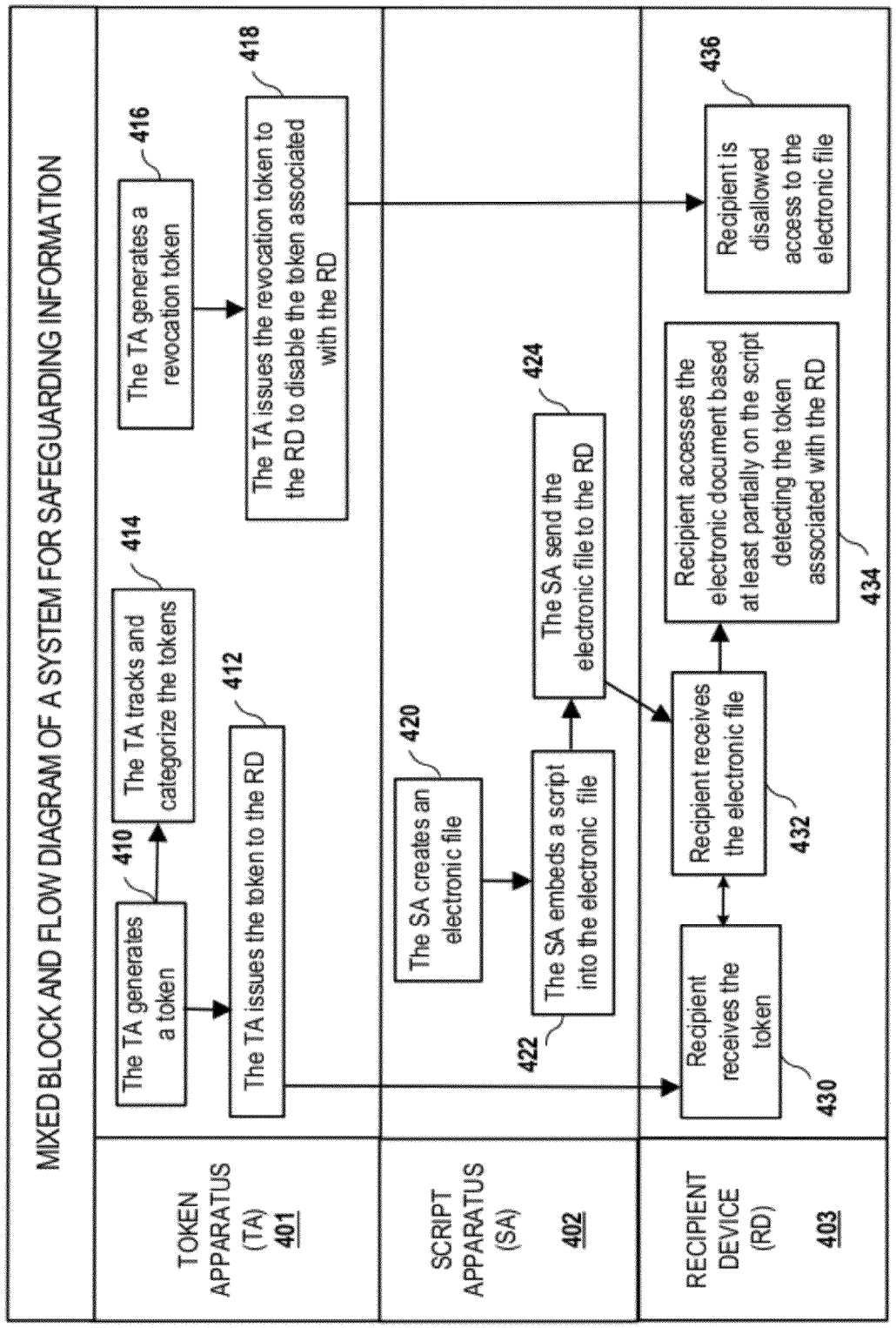
Figure 5:
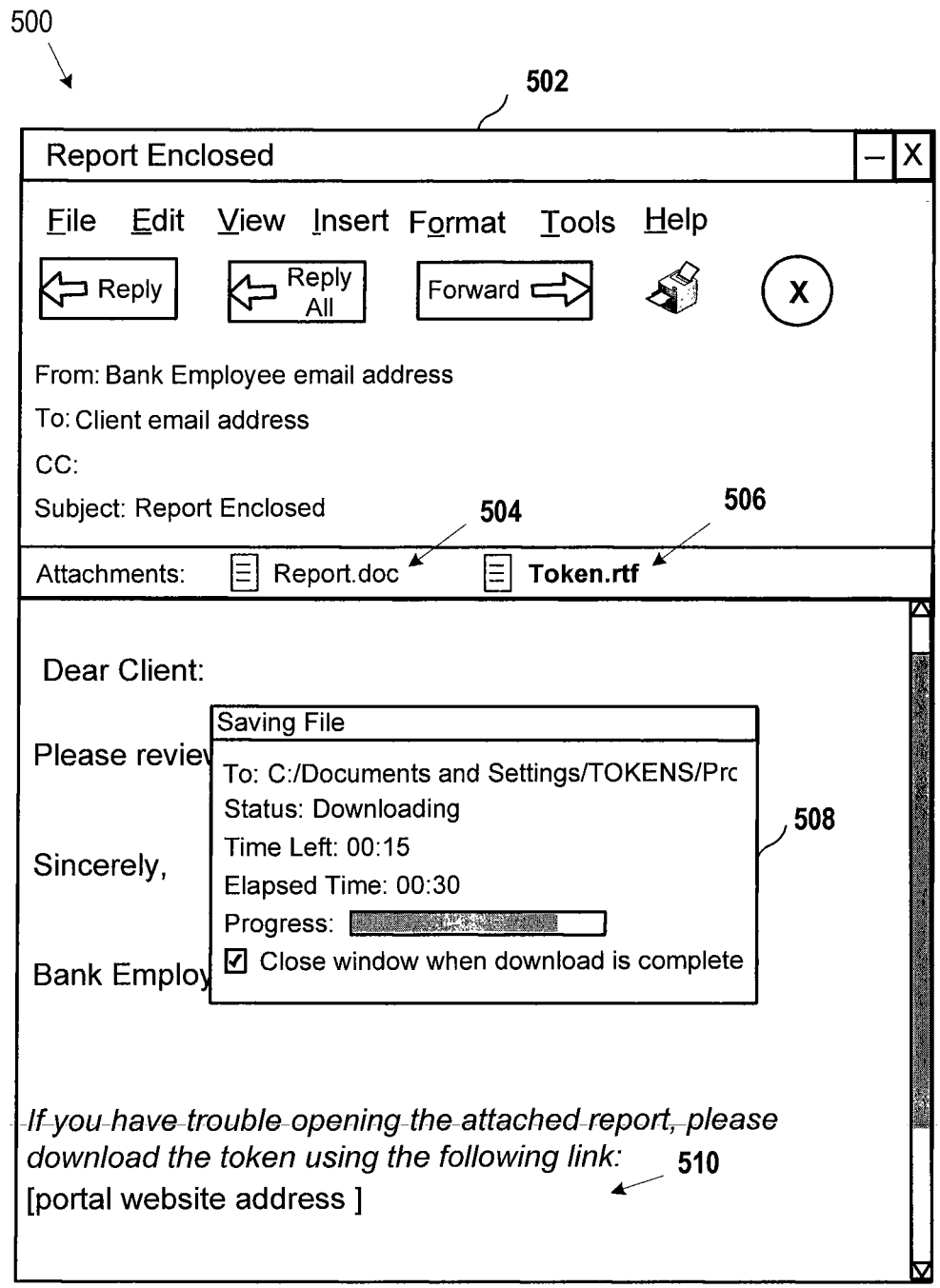
Figure 6:
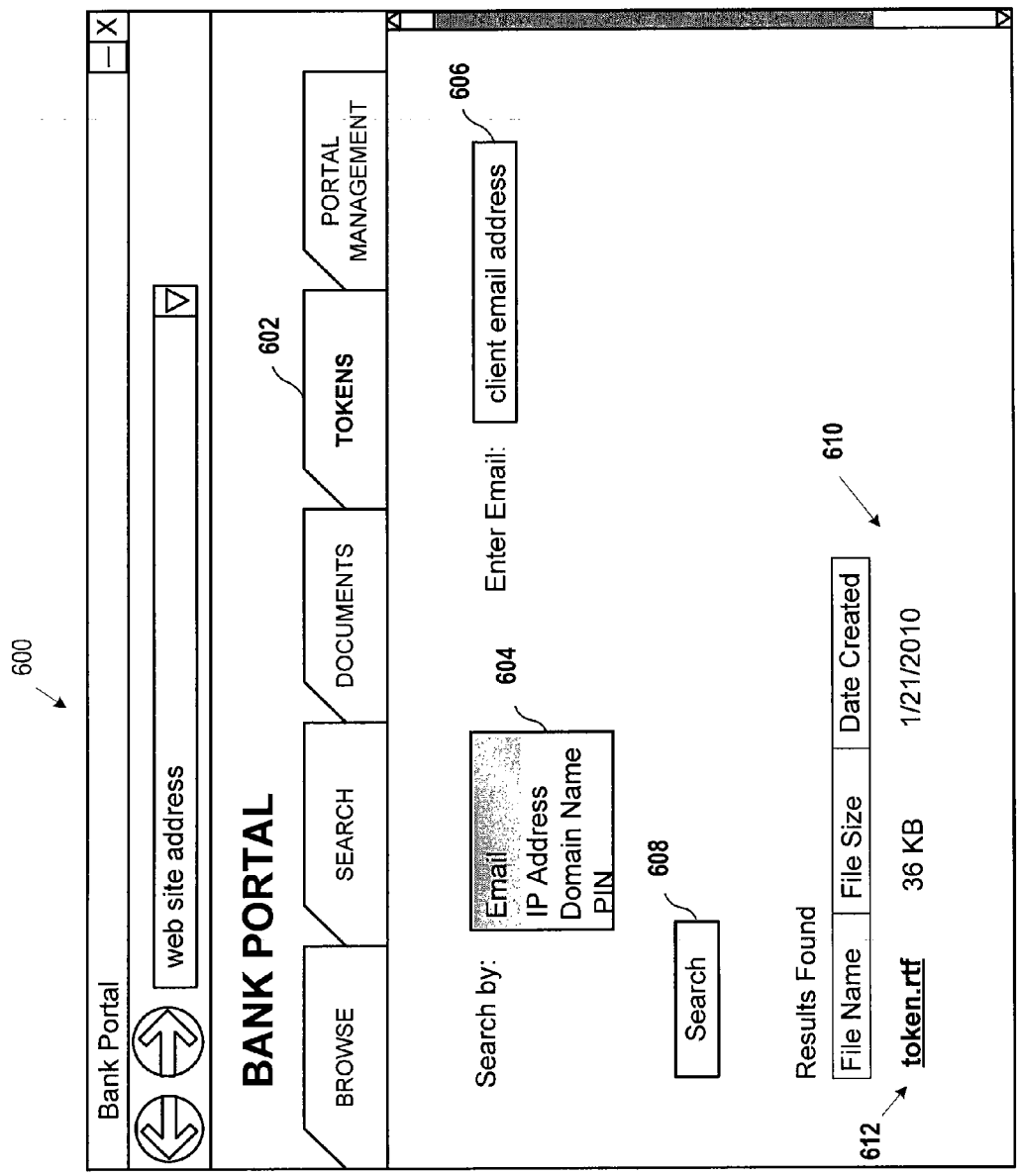
Figure 7:
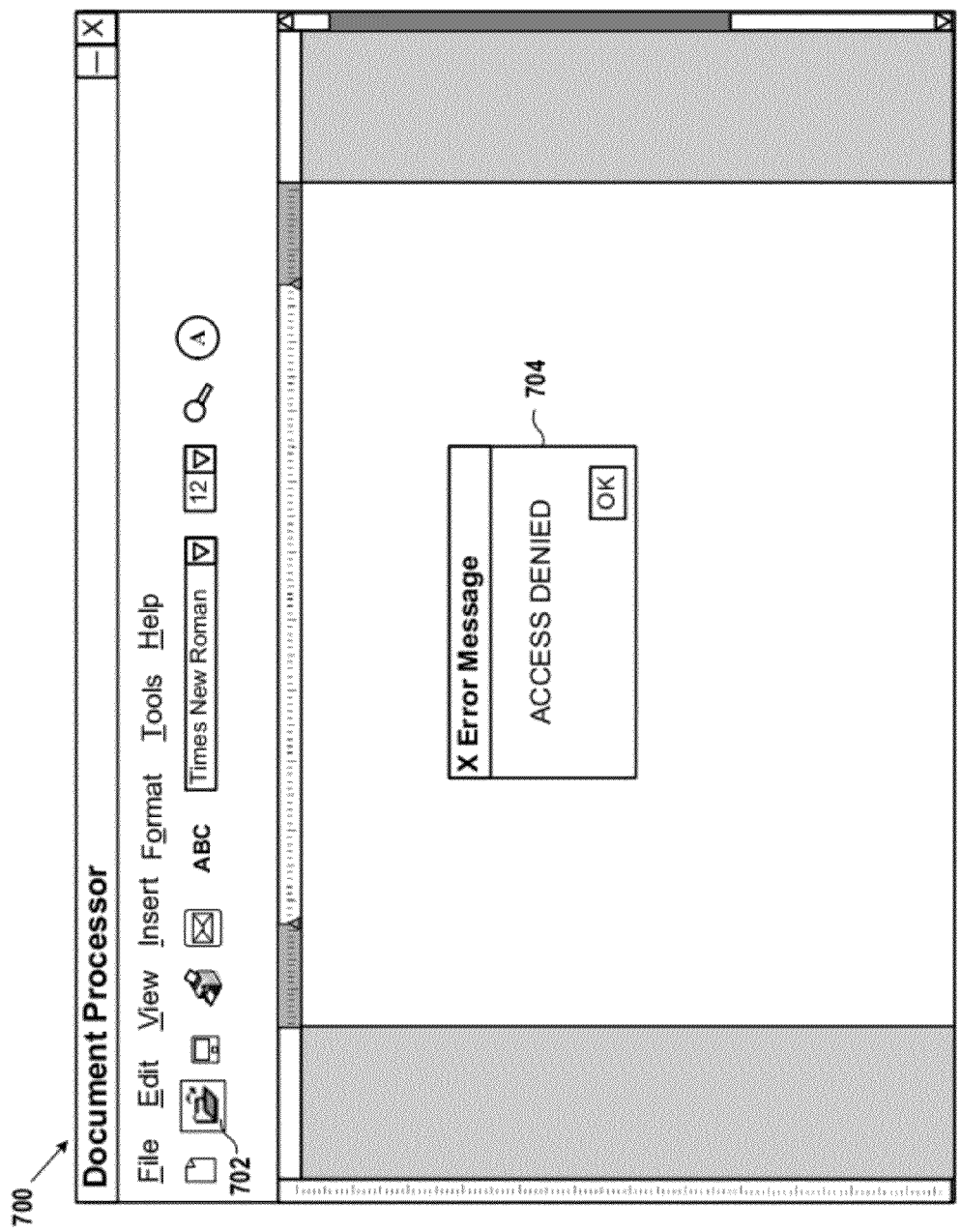

Having thus described some embodiments of the present invention in general terms, reference will now be made to the accompanying drawings, wherein:

FIG. 1 is a flow diagram illustrating a general process flow of an apparatus for safeguarding information, in accordance with an embodiment of the present invention;

FIG. 2A is a flow diagram illustrating a general process flow of an apparatus for safeguarding information, in accordance with an embodiment of the present invention;

FIG. 2B is a flow diagram illustrating a general process flow of an apparatus for safeguarding information, in accordance with an embodiment of the present invention;

FIG. 3 is a block diagram illustrating technical components of a system for safeguarding information, in accordance with an embodiment of the present invention;

FIG. 4 is a mixed block and flow diagram of a system for safeguarding information, in accordance with an embodiment of the present invention;

FIG. 5 is an exemplary graphical user interface illustrating receipt of an electronic document and token, in accordance with an embodiment of the present invention;

FIG. 6 is an exemplary graphical user interface illustrating retrieval of a token, in accordance with an embodiment of the present invention; and FIG. 7 is an exemplary graphical user interface illustrating denial of access to an electronic file, in accordance with an embodiment of the present invention.

DETAILED DESCRIPTION OF EMBODIMENTS OF THE PRESENT INVENTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, and/or operational aspects of any of the embodiments described and/or contemplated herein may be included in any other embodiment of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of apparatuses and/ or methods. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory and/or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator-and/or human-implemented steps in order to carry out an embodiment of the present invention.

In general terms, embodiments of the present invention relate to methods and apparatuses for safeguarding information. For example, some embodiments of the present invention are configured to embed a script in an electronic file (e.g., an electronic word processing document, an electronic spreadsheet document, etc.). In some embodiments, the script is configured to provide a recipient device with access to the electronic file based at least partially on the script detecting a token associated with the recipient device. In other embodiments, the script is additionally or alternatively configured to provide the recipient device with access to the electronic file based at least partially on the script determining that the recipient device is an authorized device. Also, it will be understood that, in some embodiments, the script is configured to automatically (i.e., without human intervention) provide the recipient device with access to the electronic file, such that the use and/or presence of the script is transparent and/or otherwise unnoticeable to a user of the recipient device.

Referring now to FIG. 1, a general process flow 100 of an apparatus for safeguarding information is provided that details the environment in which the apparatus may operate, in accordance with an embodiment of the present invention. As represented by the block 110, the apparatus is configured to generate a token. As represented by the block 120, the apparatus is also configured to issue the token to the token to a recipient device. In addition, as represented by the block 130, the apparatus is configured to create an electronic file. As represented by the block 140, the apparatus is further configured to embed a script in the electronic file. Still further, as represented by the block 150, the apparatus is configured to send the electronic file having the script to the recipient device, where the script is configured to provide the recipient device with access to the electronic file based at least partially on the script detecting the token associated with the recipient device.

It will also be understood that the apparatus having the process flow 100 can include one or more separate apparatuses (e.g., the token apparatus 330, the script apparatus 340, the recipient device 320 described in FIG. 3, and/or a trusted third party device, etc.). For example, in some embodiments, one apparatus (e.g., the token apparatus 330, etc.) is configured to perform the portions of the process flow 100 represented by the blocks 110-120, and a second apparatus (e.g., the script apparatus 340, etc.) is configured to perform the portions represented by the blocks 130-150. As another example, in some embodiments, one apparatus (e.g., the token apparatus 330, etc.) is configured to perform the portions of the process flow 100 represented by the block 110, a second apparatus (e.g., the script apparatus 340, etc.) is configured to perform the portion represented by the block 120-150.

Regarding the block 110, it will be understood that apparatus having the process flow 100 can be configured to generate the token in any way. It will be understood that the token can be any software or hardware device that can be detected by the script. For example, in some embodiments, the token can include software such as a file that contains code that can be read by the script. As still another example, in some embodiment, the token can include hardware such as key fobs, flash drives, dongles, smart cards, Bluetooth tokens, RFID devices, and other hardware devices. The apparatus having the flow 100 can be configured to generate the software token, for example, via a software application. It will be understood that, in some embodiments, the token can be created by entering an identification number associated with the creator of the token, a destination address (e.g., email address, IP address, etc.), and/or the recipient of the token, such as a customer, a vendor, or a business partner. In some embodiments, the apparatus having the process flow 100 is configured to track the number of tokens and/or categorize the tokens based on the identification number of the token creator, the destination address, and/or the recipient of the token. For example, the token can include a name of the token, a value, an expiration date, etc. In some embodiments, the token is configured to be valid for a limited period of time such that the script cannot grant access to the electronic file upon expiration of the token. For example, in some embodiments, tokens to be issued to vendors can be aged and versioned so that infrastructure designs, non-public IP's, and/or architecture information can be valid for thirty days. As another example, in some embodiments, tokens to be issued to customers are aged and versioned so that electronic files, such as credit reports, are accessible to the customer for one year. As still another example, in some embodiments, tokens to be issued to business partners are aged in versioned so that electronic files such as financial reports are accessible to the business partners for six months.

Regarding the block 120, it will be understood that the apparatus having the process flow 100 can be configured to issue a token to the recipient device in any way. For example, in some embodiments, the token is deployed as an update that is pushed to the recipient device and stored on a specific directory file associated with the recipient device. As still another example, in some embodiments, the token can be communicated to and from the apparatus having the process flow 100 as an attachment to an email message. The token may be issued to the recipient device as an email attachment sent along with the electronic document or the token may be issued to the recipient device in a separate email. As another example, in some embodiments, the apparatus having the process flow 100 can be configured to automatically attach a token to an email via a plug-in associated with an email application. As still another example, in some embodiments, the apparatus having the process flow 100 is configured to issue the token by other Internet Protocol from a remote server, TCP/IP, or other protocol on a local network (e.g., a home network), etc. As yet another example, in some embodiments, the token is sent to the recipient device via an application portal. As another example, in some embodiments, the recipient device is manually embedded with the token. When the apparatus having the process flow 100 receives the token, such as may be associated with an email message, for example, the token can be automatically accepted or a user may be prompted with a graphical display requesting specific instructions as to whether the token should be accepted. In order to mitigate the potential of receiving false authorizations via email (or spamming), password protection or other authentication techniques may be employed. The password may be provided (e.g., entered by the sender) as part of the token or it may be in another portion of the email message. Alternatively or additionally, the sender's email address may be examined to determine whether it corresponds to a source that has been pre-authorized by the user.

Further with regard to the block 120, the token, in some exemplary embodiments, can be configured to be stored at a specific location in the recipient device. For example, in some embodiments, the token can be stored in a directory structure of the apparatus have process flow 100 (e.g., the recipient device 320). In some embodiments, the token can be saved in a specific folder in the hard drive of the apparatus having the process flow 100. As another example, in some embodiments, a user of the apparatus having the process flow 100 is required to enter a security code (e.g., a password, an identification number, etc.) before saving the token to the apparatus. As still another example, in some embodiments, the token and a token application are issued to the apparatus having the process flow 100 and the token application is configured to automatically save the token to a specific location on the apparatus. As yet another example, in some embodiments, the token application can be configured to save the token only on devices associated with a certain identification code (e.g., an IP address, etc.). In such embodiments, the token application prevents transfer of the token to other devices. Additionally or alternatively, the apparatus having the process flow 100 can be configured to embed the token in the electronic file. In some exemplary embodiments, the apparatus having the process flow 100 is configured to automatically embed the token in the electronic file upon opening the electronic file. It will be understood that, in some embodiments, the apparatus having the process flow 100 is configured to issue the token prior to the apparatus sending the electronic file comprising the script to the recipient device. As still another example, in some embodiments, the apparatus having the process flow 100 is configured to issue the token after the apparatus has sent the electronic file comprising the script to the recipient device. It will be further understood that, in some embodiments, the token is not transferrable. For example, in some embodiments, the token cannot be forwarded to another apparatus once the token is enabled, activated, installed, or otherwise associated with the recipient device.

It will be understood that the electronic file refers to any data structure that can be stored on a storage medium. The electronic file can be, for example, stored on the memory system of a computer, hard disk drives, removable memory devices (e.g., USB flash drives), etc. The electronic file can include, for example, files associated with various computer applications such as desktop publishing applications; diagramming programs; project management software; word processors, spreadsheet applications, graphics software, video applications, presentation applications, financial document applications, email applications, reader applications such as, electronic file converters such as a PDF converter, and other applications. The electronic file can have any file format associated with a computer application including: image file formats (e.g., JPEG, GIF, TIFF, etc.); database file formats (e.g., ACCDB, etc.); document file formats (e.g., DOC, PDF, LWP, MCW, RTF, etc.); presentation file formats (e.g., KEY, PPT, SXI, etc.); audio file formats (e.g., WAV, etc.); spreadsheet file formats (e.g., XLS, ODS, QPW, etc.); tabulated data file formats (e.g. CSV, etc.), video file formats (MV4, MPEG, etc.), and financial records file formats (e.g., TAX, etc.).

It will be understood that, in some embodiments, the electronic file contains confidential information and/or non-public information. As an example, confidential information can include: intellectual property, trade secrets, copyrighted information, network architecture, device configurations, non-public financial information, source code, business processes, identification information, unfiled patent applications, crypto keys, security architecture, or any similar type of information. As another example, in some embodiments, the information can include any type of information that can be misused to compromise the integrity of proprietary business systems, allow unauthorized access to confidential information, disrupt services, impart a competitive edge, or impart a reputational risk. As still another example, in some embodiments, the electronic file contains private personal information (e.g., a social security number, an account number, etc.) and public information (e.g., a street address, phone number, etc.).

In some embodiments, the script is a command, such as a rule, instruction, or pattern, used to execute commands or functions, such as a macro or batch file. For example, in some embodiments, the script is a set of instructions that can be executed without user interaction. As another example, in some embodiments, the script it a computer code program or software that can be configured to control the behavior of a computer application. The script can include Visual Basic Scripting Edition (VBScript), Visual Basic for Applications (VBA) script, and the like. The apparatus having the process flow 100 can be configured to create the script via a software application. In some embodiments, the device embedding the script in the electronic file is the same device that creates and/or opens the electronic file. For example, in some embodiments, a computer application (e.g., a document processor) creates or opens an electronic file and also embeds the script in the electronic file.

Regarding the block 130, it will be understood that apparatus having the process flow 100 can be configured to create the electronic file in any way. For example, in some embodiments, the apparatus having the process flow 100 is configured to create the electronic file by modifying an existing electronic file. As another example, in some embodiments, the apparatus is configured to create the electronic file by opening a new file. It will be understood that, in some embodiments, a software application associated with the apparatus having the process flow 100 is used to create the electronic file. For example, the application used to create the electronic file can include: a word processor, a spread sheet processor, a financial document application, an image application, a database application, a presentation processor, an email application, or any other application or combination of applications capable of creating the electronic file.

It will be understood that, the term "embed" or "embedding," as used herein, refers without limitation to a process of incorporating, placing, or fixing content into a computer medium. For example, scripting language can be encoded into an electronic file, such as an electronic document.

Regarding the block 140, it will be understood that that the apparatus having the process flow 100 can be configured to embed the script into the electronic file in any way. For example, in some embodiments, the apparatus is configured to embed the script into the electronic file upon creation of the electronic file. As another example, in some embodiments, the apparatus having the process flow 100 is configured to embed the script into the electronic file automatically upon opening the electronic file created by the apparatus or other device. Additionally or alternatively, in some embodiments, the apparatus having the process flow 100 is configured to embed the script in the electronic file after creation of the electronic file and before sending the electronic file the recipient device.

In addition, it will be understood that the portion of the process flow 100 represented by the blocks 120 and 130 is meant to be construed broadly. For example, in some embodiments, the apparatus having the process flow 100 is configured to send the electronic file directly to the recipient device. As another example, in some embodiments, the apparatus having the process flow 100 is configured to send the communication indirectly (e.g., via one or more networks and/or apparatuses, etc.) to the recipient device. As still another example, in some embodiments, the apparatus having the process flow 100 is configured to send the communication to a particular address and/or account (e.g., email address, online banking account, addresses associated with a particular domain name, etc.) that can be accessed through the recipient device. As yet another example, in some embodiments, the apparatus having the process flow 100 is configured to send the electronic file by File Transfer Protocol (FTP). Accordingly, it will be understood that all of these examples and other like examples are meant to be included in the phrase "send the electronic file to a recipient device."

It will be understood that, in some embodiments, the recipient device can be any device capable of receiving the electronic file. For example, the recipient device can include the recipient device 320 (as described in more detail below). In some embodiments, the recipient device is associated with one or more targeted users. For example, the recipient device can be owned or operated by one or more customers, vendors, business partners, government entities, or any other targeted users. As another example, in some embodiments, the recipient device includes one or more devices that are associated with the same internal network or domain name.

Further regarding block 150, the script can detect the token in any way. In some embodiments, the script is configured to determine if the token is present at a specific location on the recipient device. For example, in some embodiments, the script scans the memory system (e.g., the hard drive, removable storage devices, network drives, etc.) of the apparatus having the process flow 100 to determine that the token is stored on the memory system. As another example, in some embodiments, the script detects the token embedded in the electronic file and allows access to the electronic file upon determination that the token has not expired or is otherwise valid. As still another example, in some embodiments, the script is configured to detect the token without communicating with a user of the recipient device. As yet another example, in some embodiments, the script is configured to detect the token without the script receiving input from a user of the recipient device. As another example, in some embodiments, the script can be configured to automatically scan the memory system of the apparatus having the process flow 100 to determine that the token exists and/or is valid without any input from the user. In this way, the electronic file can be accessed transparently. As yet another example, in some embodiments, the script is configured to read and/or extract data from the token to unlock the electronic file. In some embodiments, the script is configured to block access to the electronic file upon the script determining that the token is not detected on the recipient device. It will be understood that, in some embodiments, the electronic file is accessed by the apparatus having the process flow 100 using a computer application associated with the electronic file. In some exemplary embodiments, a user of the apparatus having the process flow 100 can modify the electronic file (e.g., add and/or delete data from the electronic file) using the computer application once access is granted.

Further, it will be understood that the apparatus having the process flow 100 can be configured to perform any one or more of the portions of any one or more embodiments described and/or contemplated herein, including, for example, any one or more of the portions of the process flow 200a, the process flow 200b, the system 300, and/or the system 400 described later herein.

In addition, it will be understood that the apparatus having the process flow 100 can be configured to perform any of the portions of the process flow 100 represented by the blocks 110-150 upon or after one or more triggering events. As used herein, it will be understood that a "triggering event" refer to an event that automatically triggers the execution, performance, and/or implementation of a triggered action, either immediately, nearly immediately, or sometime after (e.g., with minutes, etc.) the occurrence of the triggering event. For example, in some embodiments, the apparatus having the process flow 100 is configured such that the apparatus determining that electronic file has been created or opened (the triggering event) automatically and immediately or nearly immediately triggers the apparatus to embed the electronic file with a script (the triggered action). In some embodiments, the apparatus is additionally or alternatively configured to automatically send the token to the recipient device (triggered action) immediately or nearly immediately after generating the token (triggering event).

Referring now to FIGS. 2A-2B, general process flows 200a and 200b of an apparatus for safeguarding information are provided, in accordance with embodiments of the present invention. Like the apparatus having process flow 100, the apparatus having the process flow 200a or 200b is configured to create and electronic file, as represented by the block 130, and embed a script in an electronic file, as represented by the block 140. Further, in FIG. 2A, the apparatus having the process flow 200a is configured to send the electronic file to a recipient device, where the script is configured to provide the recipient device with access to the electronic file based at least partially on the script determining that the recipient device is an authorized device, as represented by the block 210. In FIG. 2B, the apparatus have the process flow 200b is configured to send the electronic file to a recipient device, where the script is configured to: (I) determine that a token associated with the recipient device is not detected on the recipient device; and (II) provide the recipient device with access to the electronic file based at least partially on the script determining that the recipient device is an authorized device, as represented by the block 220.

It will be understood that the authorized device includes any device that is capable of accessing the electronic file with or without the token. For example, in some embodiments, the authorized device can include devices that do not accept electronic files that require tokens. As another example, in some embodiments, the authorized device removes, deletes, or invalidates tokens issued to the authorized device such that the token is not associated with the authorized device. As another example, in some embodiments, the authorized device includes devices associated with law enforcement agencies, regulatory agencies and other government agencies, as well as certain vendors, business partners, and customers. As still another example, in some embodiment, the authorized device is a device associated with a white list. As yet another example, in some embodiments, the authorized device includes one or more devices associated with a domain or a user group that are associated with a white list.

Referring to FIGS. 2A, with regard to the block 210, the apparatus having the process flow 200a can be configured to determine that the recipient device is an authorized device in any way. As an example, in some embodiments, the apparatus having the process flow 200a is configured to determine if the recipient device is an authorized device based on one or more destination address (e.g., email address, domain name, IP address, etc.) and/or the identity of a user associated with the white list. As another example, in some embodiments, the apparatus having the process flow 200a is configured to determine the identity of the recipient device based on the electronic file. For example, the apparatus having the process flow can be configured to automatically associate the electronic file with the authorized device based on the name, contents, or format of the electronic file, etc.

With regard to the block 210, the apparatus having the process flow 200a can be configured to send the electronic file to the authorized device in any way. For example, the apparatus having the process flow 200a can send the electronic file to the authorized device in the same manner as the apparatus having the process flow 100 discussed above. Alternatively or additionally, the apparatus having the process flow 200a can be configured to modify, disable, or remove the script from the electronic file before sending the electronic file to the white listed device.

Further, with regard to the block 210, the script can be configured to determine that the recipient device is an authorized device in any way. For example, in some embodiments, the script can be configured to include one or more targeted identifiers (e.g., a destination address, an IP address or range or IP addresses, etc.) and scan the system of the device to determine if an identifier associated with the recipient device (e.g., the IP address of the authorized device) matches the targeted identifier included in the script. As another example, in some examples, the script is configured to block access to the electronic file upon the script determining that the identifier associated with the recipient device does not match the targeted identifier. In such embodiments, the apparatus having the process flow 200a can be configured to access the electronic file with or without the token.

Referring to FIG. 2B, with regard to block 220, the script can be configured to determine that a token is not detected on the recipient device in any way. For example, in some embodiments, the script can be configured to detect the token associated with recipient device as described above with regard to FIG. 1 to determine if the token exists on the recipient device. In some embodiments, the script can be configured to block access to the electronic file upon determining that the token is not detected on the recipient device. Alternatively or additionally, the script can be configured to provide the recipient device with access to the electronic file based at least partially on the script determining that the recipient device is an authorized device as described above with regard to block 210 upon the script determining that the token is not detected on the recipient device. In some embodiments, the apparatus having the process flow 200b issues the token to the recipient device. For example, in some embodiments, the recipient device can be configured to remove, delete, invalidate, or block acceptance of tokens issued to the recipient device. In such embodiments, that the script determines that the token is not detected on the recipient device.

Referring now to FIG. 3, a system 300 is provided for safeguarding information, in accordance with an embodiment of the present invention. As illustrated, the system 300 includes a network 310, a recipient device 320, a token apparatus 330, and a script apparatus 340. Also shown are a recipient 315 and a sender 317.

It will be understood that, in accordance with some embodiments of the present invention, that the recipient device 320, the token apparatus 330, and/or the script apparatus 340 can each be operated, serviced, controlled, and/or maintained (collectively herein "maintained" for simplicity) by the same business (not shown), and that, in some embodiments, the sender 317 and/or recipient 315 is an agent and/or employee of that business. For example, in some embodiments, the token apparatus 330, and/or the script apparatus 340 are each maintained by the same financial institution. As another example, in some embodiments, the token apparatus 330 and script apparatus 340 are incorporated into one system. Alternatively, in some of these embodiments, the recipient device 320 is maintained by one business or individual and the token apparatus 330 and/or script apparatus 340 is maintained by a second business or individual.

As shown in FIG. 3, the recipient device 320, the token apparatus 330, and the script apparatus 340 are each operatively and selectively connected to the network 310, which may include one or more separate networks. In addition, the network 310 may include one or more interbank networks, telephone networks, telecommunication networks, local area networks (LANs), wide area networks (WANs), and/or global area networks (GANs) (e.g., the Internet, etc.). It will also be understood that the network 310 may be secure and/or unsecure and may also include wireless and/or wireline technology.

The recipient device 320 may include any computerized apparatus that can be configured to perform any one or more of the functions of the recipient device 320 described and/or contemplated herein. In some embodiments, for example, the recipient device 320 may include one or more personal computer systems, mobile phones, personal digital assistants, public kiosks, point of sale devices, network devices, and/or the like. As illustrated in FIG. 3, in accordance with some embodiments of the present invention, the recipient device 320 includes a communication interface 322, a processor 324, a memory 326 having a browser application 327 and an electronic file application 328 stored therein, and a user interface 329. In such embodiments, the communication interface 322 is operatively and selectively connected to the processor 324, which is operatively and selectively connected to the user interface 329 and the memory 326.

Each communication interface described herein, including the communication interface 322, generally includes hardware, and, in some instances, software, that enables a portion of the system 300, such as the recipient device 320, to transport, send, receive, and/or otherwise communicate information to and/or from the communication interface of one or more other portions of the system 300. For example, the communication interface 322 of the recipient device 320 may include a modem, server, electrical connection, and/or other electronic device that operatively connects recipient device 320 to another electronic device, such as the electronic devices that make up the token apparatus 330.

Each memory device described herein, including the memory 326 for storing the electronic file application 327 and other data, may include any computer-readable medium. For example, memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 3, the memory 326 includes the browser application 327 and the electronic file application 328. In some embodiments, the browser application 327 includes a web browser application and/or another application (e.g., an email application) for communicating with the token apparatus 330, the script apparatus 340 and/or other portions of the system 300. For example, in some embodiments, the recipient 315 uses the browser application 327 to send and/or receive the electronic file embedded with a script (e.g., as an email attachment, FTP, etc.). As another example, in some embodiments, the recipient 315 uses the browser application 327 to receive and/or retrieve the token from the token apparatus 330 and/or other apparatus. It will be understood that, in some embodiments, electronic file application 328 is configured for accessing, reading, printing, and/or modifying the electronic file in accordance with embodiments disclosed herein. For example, the electronic file application 328 is configured to access and/or modify the electronic file based on the script detecting a token associated with the recipient device 320. In some embodiments, the applications 327 and/or 328 include computer-executable program code portions for instructing the processor 324 to perform one or more of the functions of the browser application 327 and/or electronic file application 328 described and/or contemplated herein. In some embodiments, the browser application 327 and/or electronic file application 328 may include and/or use one or more network and/or system communication protocols.

Also shown in FIG. 3 is the user interface 329. In some embodiments, each user interface, including the user interface 329, includes one or more user output devices, such as a display and/or speaker, for presenting information to the recipient 315 and/or some other user. In some embodiments, the user interface 329 and each user interface described herein includes one or more user input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the recipient 315 and/or some other user. In some embodiments, the user interface 329 includes the input and display devices of a personal computer, such as a keyboard and monitor, that are operable to receive and display information associated with the electronic file.

FIG. 3 also illustrates the token apparatus 330, in accordance with an embodiment of the present invention. The token apparatus 330 may include any computerized apparatus that can be configured to perform any one or more of the functions of the token apparatus 330 described and/or contemplated herein. In accordance with some embodiments, for example, the token apparatus 330 may include one or more servers, mainframes, personal computers, engines, platforms, database systems, front end systems, back end systems, network devices, and/or the like. In some embodiments, such as the one illustrated in FIG. 3, the token apparatus 330 includes a communication interface 332, a processor 334, and a memory 336, which includes a token application 337 and a token datastore 338 stored therein. As shown, the communication interface 332 is operatively and selectively connected to the processor 334, which is operatively and selectively connected to the memory 336.

It will be understood that, in some embodiments, the token application 337 is configured to initiate, perform, and/or facilitate one or more of the portions of one or more of the embodiments described and/or contemplated herein, such as, for example, one or more of the portions of the process flows 100, 200a, and/or 200b described herein. For example, in some embodiments, the token application 337 is configured to issue a token to a recipient device. Additionally or alternatively, in some embodiments, the token application 337 is configured to issue a token to the script apparatus 340. For example, in some embodiments, the script embedded in the electronic file provides the script apparatus 340 with access the electronic file based at least partially on the script detecting a token associated with the script apparatus 340.

As still another example, in some embodiments, the token application 337 is configured to create, track, or categorize the token described herein, and/or issue a token to the recipient 315 at the recipient device 320. It will be also understood that, in some embodiments, the token application 337 is configured to communicate with one or more other portion of the system 300, such as, for example, the script apparatus 340 and/or recipient device 320. It will be further understood that, in some embodiments, the token application 337 includes computer-executable program code portions for instructing the processor 334 to perform any one or more of the functions of the token application 337 described and/or contemplated herein. In some embodiments, the token application 337 may include and/or use one or more network and/or system communication protocols.

In addition to the token application 337, the memory 336 also includes the token database 338. It will be understood that the token database 338 can be configured to store any type and/or amount of information. For example, in some embodiments, the token database 338 includes information associated with one or more script apparatuses 340 and/or recipient devices 320, one or more recipients 315, the electronic file, confidential information, and the like. In some embodiments, the token datastore 338 additionally or alternatively stores information associated with the token.

It will be understood that the token datastore 338 may include any one or more storage devices, including, but not limited to, datastores, databases, and/or any of the other storage devices typically associated with a computer system. It will also be understood that the token datastore 338 may store information in any known way, such as, for example, by using one or more computer codes and/or languages, alphanumeric character strings, data sets, figures, tables, charts, links, documents, and/or the like. Further, in some embodiments, the token datastore 338 may include information associated with one or more applications, such as, for example, the token application 337. For example, in some embodiments, the token datastore 338 includes information associated with the electronic file, token, recipient 315, and/or recipient device 320. It will also be understood that, in some embodiments, the token datastore 338 provides a substantially real-time representation of the information stored therein, so that, for example, when the processor 334 accesses the token datastore 338, the information stored therein is current or substantially current.

Further, FIG. 3 also illustrates the script apparatus 340, in accordance with an embodiment of the present invention. The script apparatus 340 may include any computerized apparatus that can be configured to perform any one or more of the functions of the script apparatus 340 described and/or contemplated herein. In accordance with some embodiments, for example, the script apparatus 340 may include one or more personal computer systems, mobile phones, personal digital assistants, public kiosks, network devices, and/or the like. In some embodiments, such as the one illustrated in FIG. 3, the script apparatus 340 includes a user interface 349, communication interface 342, a processor 344, and a memory 346, which includes a script application 348 stored therein. As shown, the communication interface 342 is operatively and selectively connected to the processor 344, which is operatively and selectively connected to the user interface 349 and the memory 346.

It will be understood that, in some embodiments, the script application 348 is configured to initiate, perform, and/or facilitate one or more of the portions of one or more of the embodiments described and/or contemplated herein, such as, for example, one or more of the portions of the process flows 100, 200a, and/or 200b described herein.

For example, in some embodiments, the script application 348 includes one or more applications configured to open an electronic file and/or embed a script into the electronic file. As another example, in some embodiments, the script application 348 is configured to send the electronic file to the recipient 315 at the recipient device 320. As still another example, in some embodiments, the script application 348 is configured to issue a token generated by the token application 337. It will be also understood that, in some embodiments, the script application 348 is configured to communicate with one or more other portion of the system 300, such as, for example, the token apparatus 420 and/or the recipient device 320. For example, in some embodiments, the script apparatus 340 receives tokens from the token apparatus 330 and/or electronic files from the recipient device 320. It will be further understood that, in some embodiments, the script application 348 includes computer-executable program code portions for instructing the processor 344 to perform any one or more of the functions of the script application 348 described and/or contemplated herein. In some embodiments, the script application 348 may include and/or use one or more network and/or system communication protocols.

It will also be understood that the system 300 (and/or one or more portions of the system 300) may include and/or implement any embodiment of the present invention described and/or contemplated herein. For example, in some embodiments, the system 300 (and/or one or more portions of the system 300) is configured to implement any one or more of the embodiments of the process flow 100 described and/or contemplated herein in connection with FIG. 1, any one or more of the embodiments of the process flow 200a described and/or contemplated herein in connection with FIG. 2a, any one or more of the embodiments of the process flow 200b described and/or contemplated herein in connection with FIG. 2b, any one or more of the embodiments of the system 400 contemplated herein with connection to FIG. 4, and or any one or more of the embodiments described and/or contemplated herein in connections with FIGS. 5-7.

As a specific example, in accordance with an embodiment of the present invention, (1) token apparatus 330 is configured to generate a token, as represented by the block 110; (2) the token apparatus 330 and/or script apparatus 340 are configured to issue the token to the recipient device 420 as illustrated by the block 120 in FIG. 1; (3) the token apparatus 330 and/or script apparatus 340 are configured to create and electronic file and embed a script in the electronic file, as represented by the blocks 130-140 in FIG. 1; (4) the token apparatus 330 and/or the script apparatus 340 are configured to send the electronic file to the recipient device 320, where the script is configured to provide the recipient device 320 with access to the electronic file based at least partially on the script detecting a token associated with the recipient device. It will be understood that, in accordance with some embodiments, the token apparatus 330, the script apparatus 340, and/or the recipient device 320, are each configured to send and/or receive one or more instructions to and/or from each other, such that an instruction sent from a first apparatus to a second apparatus can trigger that second apparatus to perform one or more portions of any one or more of the embodiments described and/or contemplated herein.

Referring now to FIG. 4, a mixed block and flow diagram of a system 400 for safeguarding information is provided, in accordance with a more-detailed embodiment of the present invention. As shown, the system 400 includes a token apparatus 401 (e.g., the token apparatus 330 shown in FIG. 3, etc.), a script apparatus 402 (e.g., the script apparatus 340 of FIG. 3, etc.), and a recipient device 403 (e.g., the recipient device 320 shown in FIG. 3, etc.). It will be understood that recipient device 403 is operatively and selectively connected to the token apparatus 401 and/or the script apparatus 402 via one or more networks (not shown). It will also be understood that, in accordance with some embodiments, the token apparatus 401 is accessible to a token user (not shown), the script apparatus 402 is accessible to a script user, and the recipient device 403 is accessible to the recipient 315. In some embodiments, the token apparatus 401, and the script apparatus 402 are maintained by the same business (e.g., a retail store, a bank, etc.), and that the token user and/or the script user are employees of that business. In other embodiments, the token apparatus 401 is maintained by one business (e.g., a bank), the script apparatus 402 is maintained by another business (e.g., a trusted third party), and the recipient device 403 is maintained by another business, agency, and/or an individual (e.g., a vendor or customer of the bank).

As represented by the block 410, the token apparatus 401 generates a token. Then, as represented by the block 412 the token apparatus 401 issues the token to the recipient device 403. As represented by the block 414, the token apparatus 401 tracks and categorizes one or more tokens. Additionally, the token apparatus 401 generates a revocation token, as represented by the block 416, and also issues the revocation token to the recipient device 403 to disable the token associated with the recipient device as represented by the block 418.

As represented by the block 420, the script apparatus 402 creates an electronic file. It will be understood that the electronic file is created by opening a new file and/or an existing file. Then, as represented by the block 422, the script apparatus 402 embeds a script into the electronic file, for example, automatically upon creation of the electronic file or manually after the electronic file has been created. As represented by the block 424, the script apparatus 402 sends the electronic file to the recipient device 403.

As represented by the block 432, the recipient uses the recipient device 403 to receive the electronic file from the script apparatus 402, and also receives the token from the token apparatus 401, as represented by the block 430. Then, as represented by the block 434, the recipient uses the recipient device 403 to access the electronic file based at least partially on the script detecting the token associated with the recipient device 403. Further, as represented by the block 436, the recipient using the recipient device 403 is disallowed access to the electronic file. It will be understood that, in some embodiments, the script is configured to deny access to the electronic file based at least partially on the script failing to detect a token association with the recipient device 403. For example, in some embodiments, the revocation token can replace the token associated with the recipient device 403. As another example, in some embodiments, the script can be configured to disallow access to the electronic file upon detection of the revocation token even when the token remains associated with the recipient device 403.

It will be understood that the embodiment illustrated in FIG. 4 is merely exemplary and that other embodiments may vary without departing from the scope and spirit of the present invention. For example, in some alternative embodiments, one or more of the portions of the process flow represented by the blocks 410-418 are initiated, performed, and/or facilitated by the script apparatus 402 instead of the token apparatus 401. As another example, in some embodiments, one or more of the portions of the process flow represented by the blocks 420-424 are initiated, performed, and/or facilitated by the token apparatus 401 instead of the script apparatus 402.

It will also be understood that, in some embodiments, one or more of the portions of the process flow represented by the blocks 410-436 are initiated, performed, and/or facilitated automatically. For example, as represented by the block 434, the script can be configured to detect the token without communicating with the recipient or other user of the recipient device, thereby allowing the recipient to access the electronic document using the recipient device 403 in a transparent manner. As another example, in some embodiments, the script apparatus automatically embeds the script in the electronic file upon creation of the electronic file using a specific application, such that every file created using the application is embedded with a script.

It will be understood that the system 400 is configured to perform the process flow 100 of FIG. 1 and that the blocks 410-436 exemplify the process flow 100. It will be further understood, that in some embodiments, the system 400 can be configured to perform the process flow 200*a* of FIG. 2*a* or the process flow and 200*b* of FIG. 2*b*. For example, in some embodiments, the system 400 can be configured such that the token apparatus 401 or script apparatus 402 does not need to generate or issue a token to the recipient device 403.

Referring now to FIGS. 5-7, exemplary graphical user interfaces (GUI) 500, 600, and 700 are provided, in accordance with an embodiment of the present invention. It will be understood that, in some embodiments, each of the GUI's 500, 600, and 700 is associated with one or more computer devices. Also, it will be understood that the GUI's 500, 600, and 700 can be embodied as portions of a software application, portions of a portal application, as intranet pages, as Internet web pages, and/or the like. In addition, it will be understood that, in some embodiments, the apparatus having the process flow 100, the system 300, and/or the system 400 are configured to implement any one or more of the embodiments of the present invention described and/or contemplated herein in connection with the GUI's 500, 600, and 700. It will be further understood that, in some embodiments, the apparatus having the process flow 200*a* and/or the apparatus having the process flow 200*b* can be configured to modify any one or more of the embodiments of the present invention described and/or contemplated herein in connection with the GUI's 500, 600, and 700.

Referring now to FIG. 5, it will be understood that the graphical user interface 500 is displayed on the screen after and/or in response to an apparatus (e.g., the apparatus having the process flow 100, the script apparatus 340, etc.) sending the electronic file and/or issuing the token to the recipient device. In the illustrated embodiment, the graphical user interface 500 is an interface associated with an email application. As shown, the graphical user interface 500 includes a subject header 502, an electronic file attachment 504 entitled "Report," a token attachment 506 entitled "Token," a "Saving file" dialogue box 508, and a hyperlink 510. In the illustrated embodiment, the subject of the email concerns the "Report Enclosed." The electronic file attachment 504 is a document file, and the token attachment 506 is a text file. Upon double clicking the token attachment 506, in the embodiment, the attachment is saved to a specific folder on the hard drive of the apparatus having the GUI 500, as indicated in the dialogue box 508. In this way, the script embedded in the electronic file attachment 504 can detect the token in the specific folder when the electronic file attachment 504 is accessed. It will be understood that, in some embodiments, that the token of the token attachment 506 must first be associated with the apparatus having the GUI 500 (e.g. saved on the hard drive or embedded in the electronic file) before the electronic file can be accessed. In the embodiment, the hyperlink 510 links to a portal website (discussed in detail with regard to FIG. 6 below) where the token can be retrieved in the event that the electronic file attachment 504 cannot be accessed (e.g., if the token attachment is corrupt).

Referring now to FIG. 6, an exemplary GUI that may be provided, for example, on a bank portal or other online system is illustrated. In the illustrated embodiment, the GUI 600 is an exemplary interface where a user can click on the link entitled "Tokens" in a tab 602 near the top of the page to retrieve a token. Upon selection of this link, the GUI 600 is provided to the user. The GUI 600 displays a set of fields for retrieving the token. The user selects a search option by clicking on one of the options in a search field 604. Once a search option has been selected, the user enters an email address in an email field 606 if prompted. After entering the email address, the user can click on a search button 608 to search for tokens associated with the entered email address. After the search is complete, a list of tokens 610 is provided to the user. The user can click on a file name link 612 to download the token. It will be understood that, in some embodiments, a user accesses a web portal to retrieve a token using security measures. For example, in some embodiments, a user of the recipient device enters a security code into a designated field on the web portal in order to retrieve the token.

Referring now to FIG. 7, it will be understood that the GUI 700 is displayed after and/or in response to an apparatus (e.g., the apparatus having the process flow 100, the recipient device 320, etc.) receiving the electronic file. In the illustrated embodiment, the GUI 700 is associated with a document processor. As shown, the GUI 700 includes a shortcut button 702 and a dialogue box 704. In this embodiment, the, user can click on the short cut button 702 to open the electronic file, such as a document. For example, upon clicking the short cut button 702, the user can search the hard drive of the apparatus having the GUI 700 and select an electronic file to open. After selecting an electronic file, the dialogue box 704 appears to indicate that access to the electronic file is denied due to an error. In some embodiments, the dialogue box 704 appears when the token is not detected by the script or when the token is invalid (e.g., expired, disabled by a revocation token, etc).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for safeguarding data, the system comprising:
   a computer apparatus including a first processor and a memory; and
   a software module stored in the memory comprising executable instructions that when executed by the first processor cause the first processor to:
   embed a script in an electronic file;
   generate a token associated with a token identification number;
   identify a first recipient device and a second recipient device that are each in communication with the system, the first recipient device being associated with a device identification code;
   determine that the second recipient device is an authorized device based on a name, contents, or a format of the electronic file;
   issue the token to the first recipient device and the second recipient device;
   provide a token application to the first recipient device, wherein the token application is configured to store the token at a specific location on the first recipient device in response to determining that the device identification code is associated with the first recipient device;
   send the electronic file comprising the script to the first recipient device and the second recipient device;
   wherein the script comprises commands that when operated by a second processor of the first recipient device cause the second processor of the first recipient device to open the electronic file in response to determining that the token is stored at the specific location on the first recipient device and that the token is associated with the token identification number;
   wherein the script comprises commands that when operated by a third processor of the second recipient device cause the third processor of the second recipient device to open the electronic file in response to determining that the second recipient device is an authorized device and that the token issued to the second recipient device is not detected on the second recipient device.

2. The system of claim 1, wherein the electronic file comprises confidential information.

3. The system of claim 1, wherein the script is configured to detect the token without the script communicating with a user of the first recipient device.

4. The system of claim 1, wherein the script comprises a target identifier, and wherein the script is further configured to provide the first recipient device with access to the electronic file based at least partially on the script determining that an identifier associated with the first recipient device matches the target identifier.

5. The system of claim 4, wherein the script is configured to block access to the electronic file upon the script determining that the identifier associated with the first recipient device does not match the target identifier.

6. The system of claim 1, wherein the first processor is further configured to embed a token in the electronic file prior to the first processor sending the electronic file comprising the script to the first recipient device.

7. The system of claim 1, wherein the token comprises hardware.

8. The system of claim 1, wherein the token comprises software.

9. The system of claim 1, wherein the token is configured to be valid for a limited period of time.

10. The system of claim 1, wherein the first processor is further configured to issue a revocation token to the first recipient device, wherein the revocation token is configured to disable the token associated with the first recipient device.

11. The system of claim 1, wherein the first processor is configured to issue the token to the first recipient device prior to the first processor sending the electronic file comprising the script to the first recipient device.

12. A method for safeguarding data, the method comprising:
   embedding, using a first processor, a script in an electronic file;
   generating, using the first processor, a token associated with a token identification number;
   identifying, using the first processor, a first recipient device and a second recipient device, the first recipient device being associated with a device identification code;
   determining, using the first processor, that the second recipient device is an authorized device based on a name, contents, or a format of the electronic file;
   issuing, using the first processor, the token to the first recipient device and the second recipient device;
   providing, using the first processor, a token application to the first recipient device, wherein the token application is configured to store the token at a specific location on the first recipient device in response to determining that the device identification code is associated with the first recipient device;
   sending, using the first processor, the electronic file comprising the script to the first recipient device and the second recipient device;
   wherein the script comprises commands that when operated by a second processor of the first recipient device cause the second processor of the first recipient device to open the electronic file in response to determining that the token is stored at the specific location on the first recipient device and that the token is associated with the token identification number;
   wherein the script comprises commands that when operated by a third processor of the second recipient device cause the third processor of the second recipient device to open the electronic file in response to determining that the second recipient device is an authorized device and that the token issued to the second recipient device is not detected on the second recipient device.

13. The method of claim 12, wherein the script is configured to detect the token without the script communicating with a user of the first recipient device.

14. The method of claim 12, wherein the script comprises a target identifier, and wherein the script is further configured to provide the first recipient device with access to the electronic file based at least partially on the script determining that an identifier associated with the first recipient device matches the target identifier.

15. The method of claim 14, wherein the script is configured to block access to the electronic file upon the script determining that the identifier associated with the first recipient device does not match the target identifier.

16. The method of claim 12, further comprising:
embedding a token in the electronic file prior to the sending the electronic file comprising the script to the first recipient device.

17. The method of claim 12, wherein the token is configured to be valid for a limited period of time.

18. The method of claim 12, further comprising:
issuing a revocation token to the first recipient device, wherein the revocation token is configured to disable the token associated with the first recipient device.

19. The method of claim 12, further comprising:
issuing the token to the first recipient device prior to the sending the electronic file comprising the script to the first recipient device.

20. A computer program product for safeguarding data, the computer program product comprising a non-transitory computer-readable medium, wherein the non-transitory computer-readable medium comprises computer-executable program code stored therein, wherein the computer-executable program code portions comprise:
a first program code portion configured to:
embed a script in an electronic file;
generate a token associated with a token identification number;
identify a first recipient device and a second recipient device, the first recipient device being associated with a device identification code;
determine that the second recipient device is an authorized device based on a name, contents, or a format of the electronic file;
issue the token to the first recipient device and the second recipient device;
provide a token application to the first recipient device, wherein the token application is configured to store the token at a specific location on the first recipient device in response to determining that the device identification code is associated with the first recipient device;
send the electronic file comprising the script to the first recipient device and the second recipient device;
wherein the script comprises commands that when operated by a first processor of the first recipient device cause the first processor of the first recipient device to open the electronic file in response to determining that the token is stored at the specific location on the first recipient device and that the token is associated with the token identification number;
wherein the script comprises commands that when operated by a second processor of the second recipient device cause the second processor of the second recipient device to open the electronic file in response to determining that the second recipient device is an authorized device and that the token issued to the second recipient device is not detected on the second recipient device.

21. The computer program product of claim 20, wherein the script is configured to detect the token without the script receiving input from a user of the first recipient device.

22. The computer program product of claim 20, wherein the script comprises a target identifier, and wherein the script is further configured to provide the first recipient device with access to the electronic file based at least partially on the script determining that an identifier associated with the first recipient device matches the target identifier.

23. The computer program product of claim 22, wherein the script is configured to block access to the electronic file upon the script determining that the identifier associated with the first recipient device does not match the target identifier.

24. The computer program product of claim 20, further comprising:
a second program code portion configured to embed a token in the electronic file prior to the second program code portion sending the electronic file comprising the script to the first recipient device.

25. The computer program product of claim 20, further comprising:
a second program code portion configured to issue the token to the first recipient device prior to the sending the electronic file comprising the script to the first recipient device.

26. The computer program product of claim 20, wherein the token is configured to be valid for a limited period of time.

27. The computer program product of claim 20, further comprising:
issuing a revocation token to the first recipient device, wherein the revocation token is configured to disable the token associated with the first recipient device.

* * * * *